METHOD AND APPARATUS FOR THE PURIFICATION OF LIQUIDS

Filed Aug. 31, 1949

5 Sheets-Sheet 1

INVENTOR.
Nathaniel S. Prime

BY Lancaster, Allwine & Rommel
ATTORNEYS.

INVENTOR.
Nathaniel S. Prime

BY Lancaster, Allwine & Rommel
ATTORNEYS.

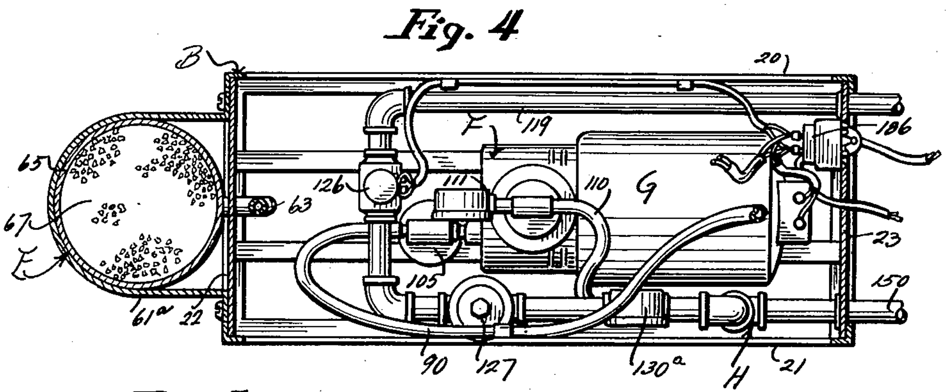
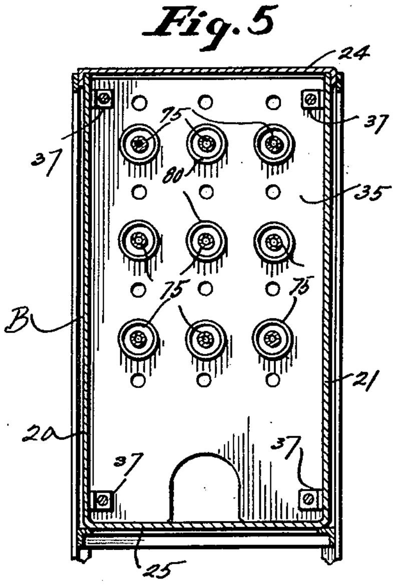
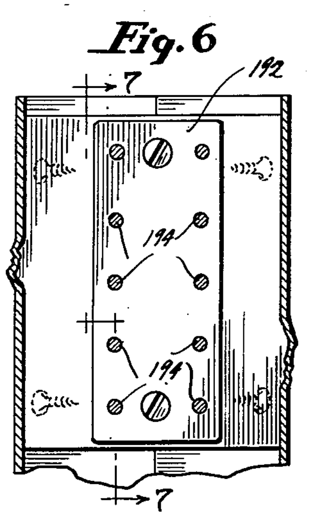
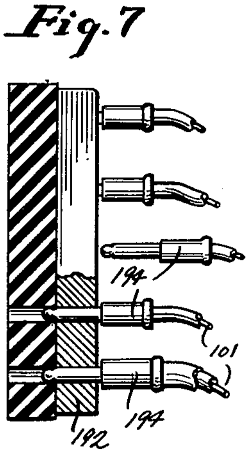
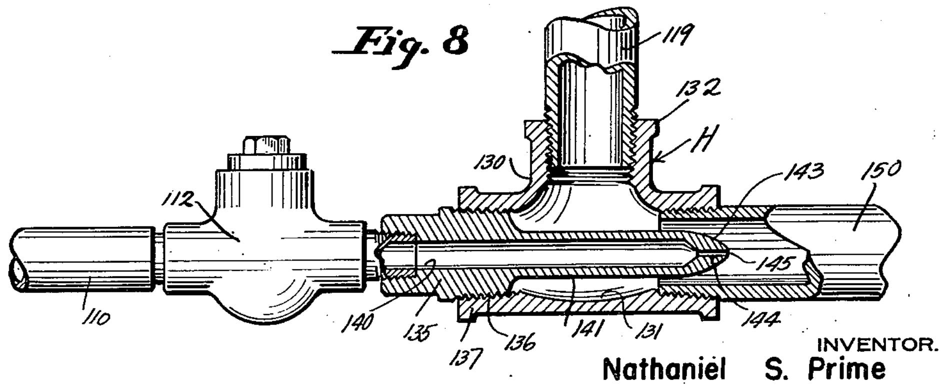
INVENTOR.
Nathaniel S. Prime
BY Lunsenter, Allen and Rommel
ATTORNEYS.

METHOD AND APPARATUS FOR THE PURIFICATION OF LIQUIDS

Filed Aug. 31, 1949 5 Sheets-Sheet 4

INVENTOR.
Nathaniel S. Prime

BY Lancaster, Allwine and Rommel
ATTORNEYS.

Nov. 24, 1953

N. S. PRIME 2,660,559

METHOD AND APPARATUS FOR THE PURIFICATION OF LIQUIDS

Filed Aug. 31, 1949

5 Sheets-Sheet 5

INVENTOR.
Nathaniel S. Prime

BY Lancaster, Allwine & Rommel
ATTORNEYS.

Patented Nov. 24, 1953 2,660,559

UNITED STATES PATENT OFFICE 2,660,559

METHOD AND APPARATUS FOR THE PURIFICATION OF LIQUIDS

Nathaniel S. Prime, Frederick, Md., assignor to Maryland Laboratories, Incorporated, Frederick, Md., a corporation of Maryland Application August 31, 1949, Serial No. 113,432

9 Claims. (Cl. 210—27)

This invention relates to improvements in methods and means for the generation of ozone and its utilization in the sterilization, purification and other treatment of fluids.

The primary object of this invention is the provision of a relatively simple, compact and efficient unit for the rapid generation of ozone, and its intimate and highly efficient intermixing with gas or liquid for the beneficial treatment thereof, such as for sterilization, purification, deodorization and/or removal of undesirable material or organic matter therefrom.

A further object of this invention is the provision of an improved ozone generating unit which is relatively simple in construction and designed for the purpose of reducing to a minimum electrical energy used per unit of ozone generated.

A further object of this invention is the provision of an improved method and apparatus for the intimate substantially stable dispersion of ozone in a body of water or other liquid.

A further object of this invention is the provision of an improved method and apparatus for the effective minute distribution of ozone throughout a body of liquid and the maintenance of the ozone in such condition in the body of liquid for a period of time and under conditions which will assure the treatment desired.

A further object of this invention is the provision of an improved method and means for obtaining a high count distribution of ozone in a body of liquid.

Other objects and advantages of the invention will be apparent during the course of the following detailed description.

In the accompanying drawings, forming a part of this specification, and wherein similar reference characters designate corresponding parts throughout the several views—

Figure 4 is a transverse cross sectional view taken through the apparatus substantially on the line 4—4 of Figure 2.

Figure 5 is a vertical cross sectional view taken substantially on the line 5—5 of Figure 2.

Figure 6 is a cross sectional view taken substantially on the line 6—6 of Figure 3.

Figure 7 is a cross sectional view taken substantially on the line 7—7 of Figure 6.

Figure 8 is a fragmentary view, partly in section, showing an improved injector for the efficient jet mixing of ozone with the liquid to be treated.

Figures 10, 11, 12, 13, 14, 15:
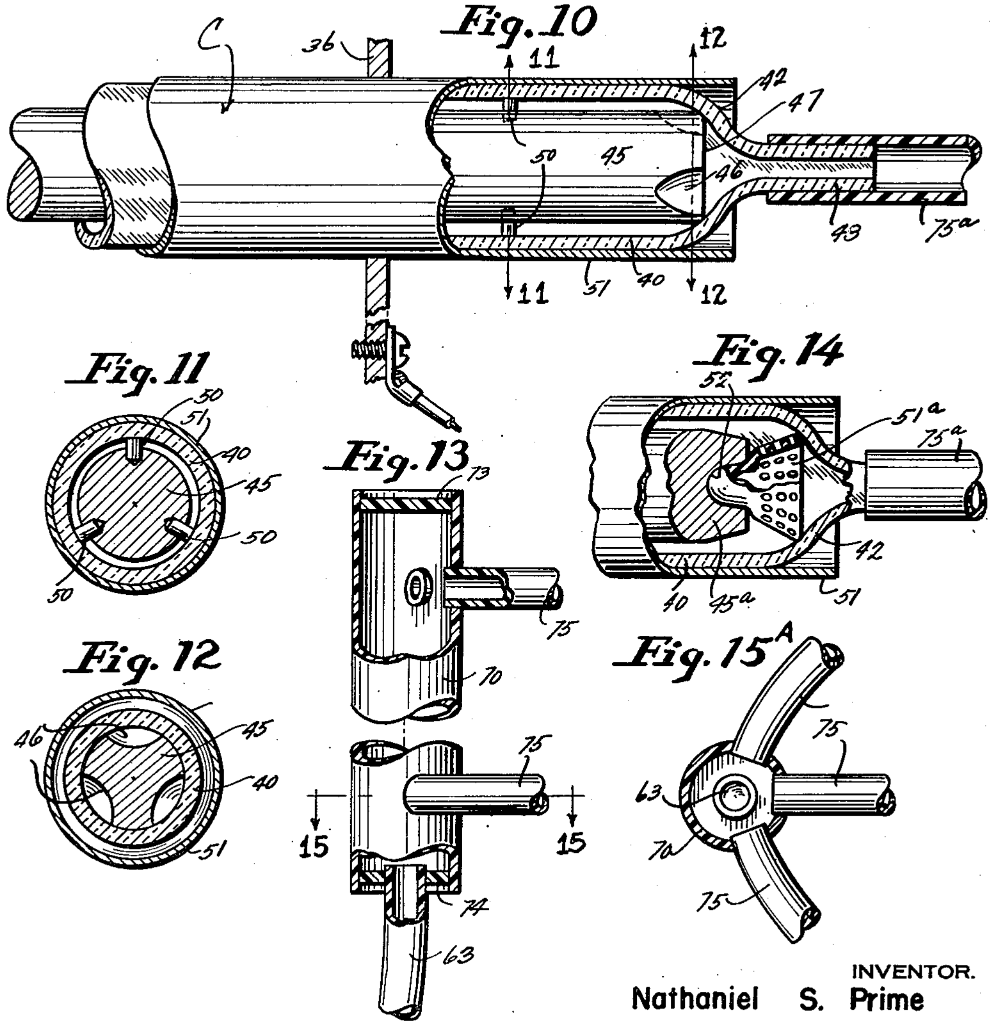
Figure 10 is a fragmentary view, partly in section, of the other end of the ozone generating tube.
Figure 15:
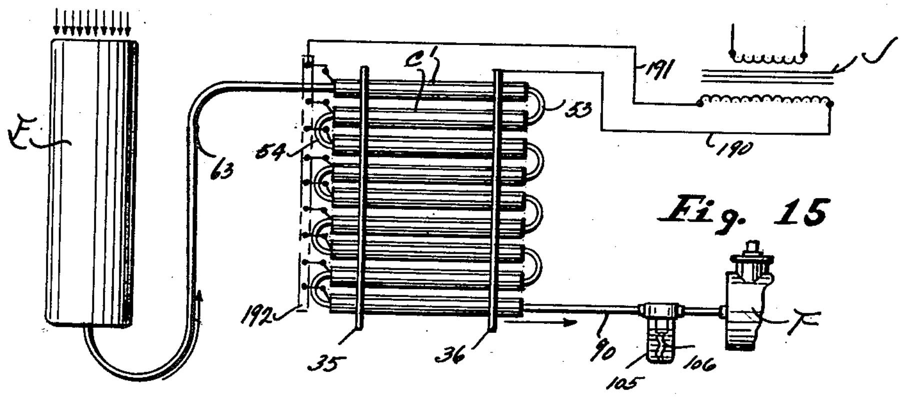

Figures 11 and 12 are cross sectional views taken substantially on the respective lines 11—11 and 12—12 shown in Figure 10.

Figure 13 is a fragmentary view, partly in section, showing the construction of an air distributing header and its associated connecting tubes.

Figure 14 is a modified form of structure for the mounting of the inner electrode of an ozone generating unit.

Figure 15ª is a cross sectional view taken substantially on the line 15—15 of Figure 13.

Figure 1:
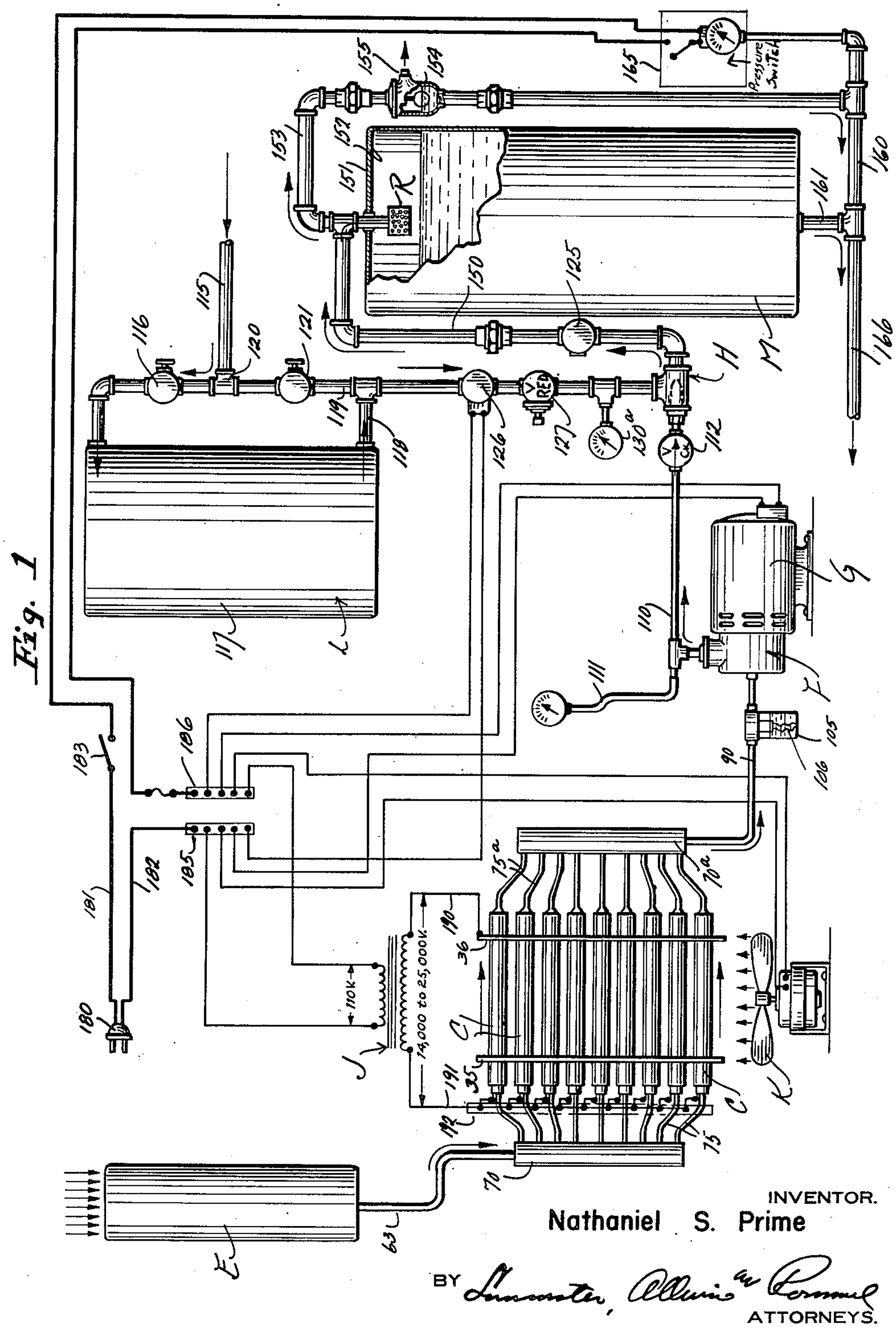
Figure 1 is a diagrammatic view showing the various units of the improved apparatus and the wiring system used in connection therewith.

Figure 15 is a diagrammatic view showing the ozone generating tubes connected in series rather than in parallel as shown in Figure 1.

Figure 16:
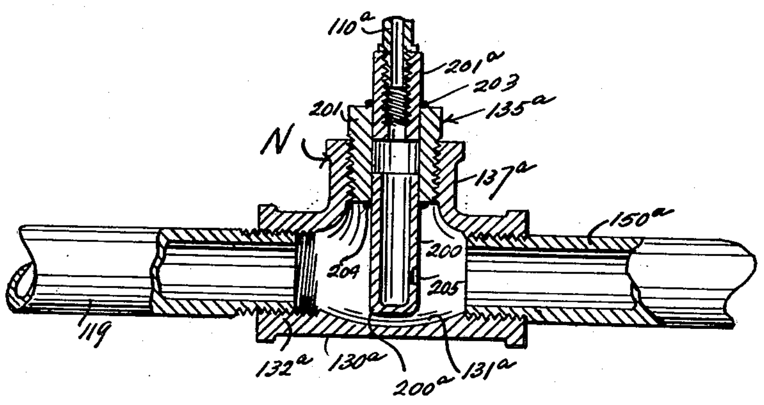

Figure 16 is a cross sectional view showing a modified form of injector for mixing of ozone with the liquid to be treated.

Figure 17:
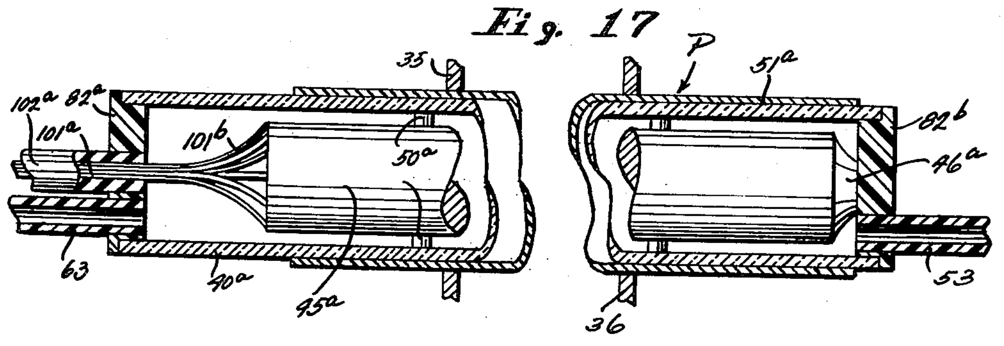

Figure 17 is a fragmentary cross sectional view of a modified form of ozone generating tube.

In the drawings, wherein for the purpose of illustration are shown different forms of the invention, the letter A may generally designate the improved apparatus. It includes a compact casing B adapted to house a battery of ozone generating tubes C upon a frame structure D. An air filter E is mounted externally upon the casing and connected with the ozone generating tubes for supplying air thereto. The casing B may receive therein a compressor F operated by a motor G and the casing may also receive a transformer J and fan K therein. The apparatus furthermore includes a water filter L for supply of water to the injector H, and the ozone treated water may be disposed in an improved type of storage or distribution container M. As shown in Figure 15 the ozone generating tubes C′ may be connected in series. Also a modified form of injector N may be provided in lieu of the injector H. A modified form of ozone generating tube P may be provided, if desired, as shown in Figure 17.

Referring to the casing structure B, the same may comprise a rectangular-shaped cabinet including side walls 20 and 21, end walls 22 and 23, and a cover 24. An intermediate wall 25 may divide the casing into an upper compartment 26 adapted to receive the ozone generating units; their supporting frame; the transformer and the fan structure, and a lower compartment 28 adapted to receive therein the injector, motor-compressor and other details.

The wall structures of the casing above described may consist of sheet metal plates attached to supporting legs and cross braces, as shown in the drawings, and the side and other walls may be provided with vents or other ventilating openings 30 for the purpose of enabling ready dissipation of heat.

Figure 2:
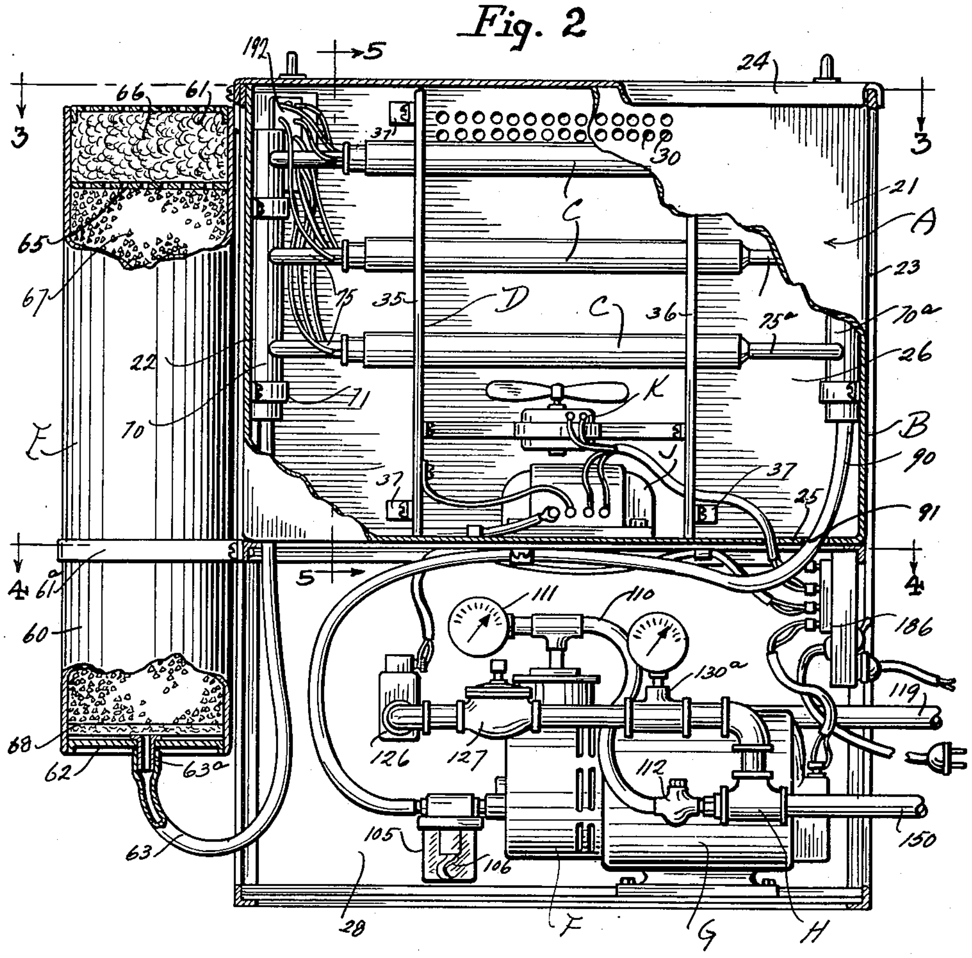
Figure 2 is a vertical cross sectional view taken through the apparatus showing the various associated features thereof.
Figure 3:
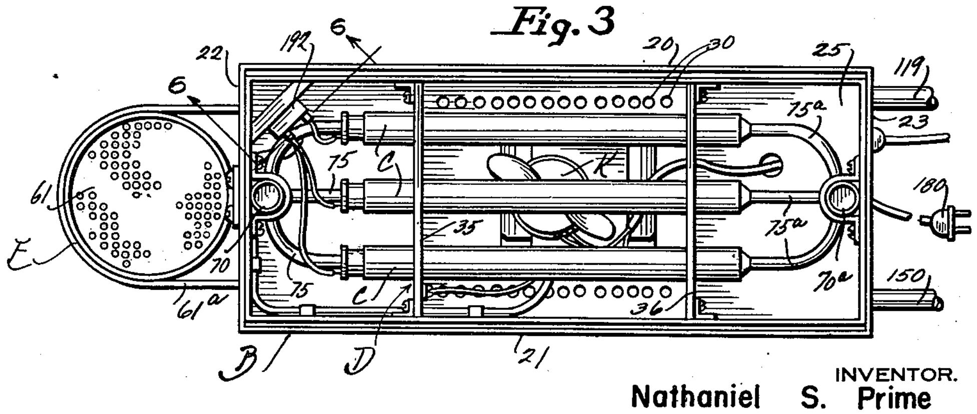
Figure 3 is a plan view of the apparatus shown in Figure 2 with the cover of the casing removed.

The ozone generating tubes C are mounted in three horizontal series of three each, as shown in the drawings. They are thus supported upon the frame D which consists of vertical walls 35 and 36 suitably apertured to receive the ends of the tubes therethrough as will be subsequently described. The supporting walls 35 and 36 may be detachably connected as at 37 to the side walls of the casing B, in the upper compartment 26, as shown in Figure 2.

The ozone units are alike in construction and each consists of a dielectric tube 40 of conventional Pyrex which consists substantially of 80% silica, 12% boron oxide, with balancing percentages of sodium oxide and alumina.

The tube 40 is cylindrical and of uniform diameter from its air entering end 41, but at the opposite end it is reducingly tapered at 42 and provided with an attaching neck 43.

The tube tension inner electrode 45 is shown as solid, but may be tubular, if so desired, and constructed of aluminum. At one end it is seated at its peripheral edge 47 against the inner surface of the reduced tapered tube end 42. Recesses 46 are provided at this end of the electrode, of a size to permit the unrestricted flow of the ozone from the discharge space into the neck 43. Throughout its length, at various locations, the ozone generating electrode 45 may be provided with relatively soft synthetic resin plastic nipples 50 recessed into suitable sockets provided in the electrode, as shown in Figures 10 and 11 of the drawings, for the purpose of accurately spacing and safely seating the electrode within the dielectric tube 40.

Figure 9:
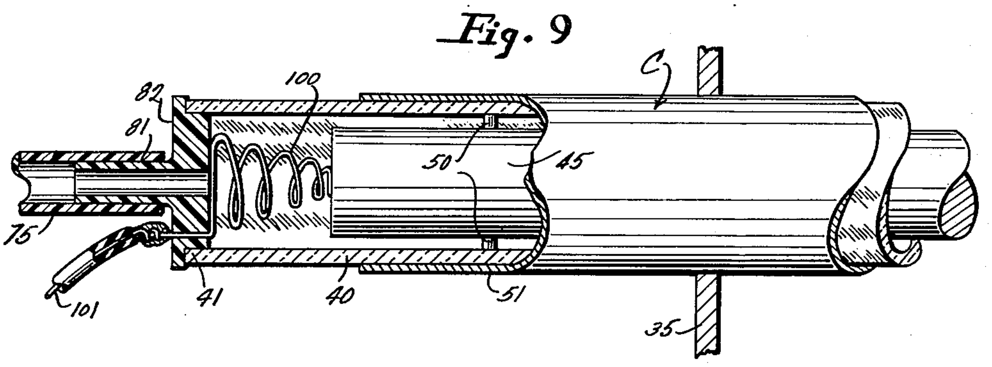
Figure 9 is a fragmentary view, partly in section, of the air entrance end of an ozone generating tube constituting a novel part of this invention.

The dielectric tube 40 for its major length is provided with an outer electrode cylinder or tube 51 of aluminum or other appropriate material. It extends in a covering relation over the reduced end 42 of the dielectric tube and terminates short of the rear portion of the dielectric tube 40, as shown in Figures 9 and 10.

The supporting walls 35 and 36 of the frame D are apertured for receiving the ozone tubes C therein, and more particularly the outer electrode cylinders 51 directly therein.

If desired, the central electrode $45^a$ shown in Figure 14, may have a modified mounting such as a flexible seat $51^a$. It may be socketed at 52 in the end of the electrode $45^a$ and rests against the inner surface of the reduced end 42 of the dielectric tube. This seat $51^a$ is suitably apertured to permit the passage of ozone from the discharge space in the ozone generating tube into the nipple end of the tube for passage therefrom. Both the seat $51^a$ and the nipple 50 may be constructed of any suitable material, such as synthetic resin plastic which is resistant to the normal deteriorating effects of ozone and the high tension electrical discharges incidental to the generation thereof.

The air filter E preferably consists of a suitable cylindrical container 60 detachably mounted as by a strap $61^a$ upon the outer surface of one end wall of the casing structure B. This container is provided with a perforated detachable top wall 61 and a bottom wall 62, having a flexible plastic tube 63 connected with a nipple structure $63^a$ upon the bottom wall, for the transfer of the filtered air into the air inlet ends of the ozone generating tubes C. A suitable removable perforated disc 65 is provided in the casing 60, dividing the filtering glass wool material 66 from a large body 67 of suitable dehydrating material such as silica gel or activated alumina. The dehydrating material 67 rests upon a suitable felt pad 68 in the bottom of the container 60 just above the wall 62. The air as it passes through the filter is first strained of any undesirable solids, dust, etc. in the glass wool area and then moisture is removed as it passes through the dehydrating material and subsequently any other solids or undesirable constituent parts are removed at the pad area.

Suitable headers are provided at both the inlet and outlet ends of the tubes for the distribution of the air into the individual tubes and the collection of the ozone in a single body prior to its use in connection with sanitizing, purifying and deodorizing of fluids. These headers, as well as all of the flexible tube connections therewith which lead from the air filter E to the tubes C, and at the exit end of the tubes C the connections leading to the compressor, are of some plastic material, such as a synthetic resin, immune to the deteriorating effects of electrical discharges and the presence of ozone. Of course all of the plastic will be a non-conductor of electricity.

At the air inlet end of the battery of tubes C, an air distributing header 70 is provided, secured by suitable straps 71 to the inside of an end wall of the casing adjacent to the air filter, as shown in Figure 2. The header tube 70 does not necessarily have to be flexible, as it may be rigid or semi-flexible. It should hold its shape and at one end it has a sealed wall 73 and at the opposite end a sealed wall 74 provided with the air transfer tube 63 connected therewith (see Fig. 13).

As before mentioned, there are three horizontally positioned series of ozone generating tubes at different levels, with three in each series. The three tubes of each of these series are provided with end and central flexible tube connections 75, as shown in Figure 15, leading to a suitable plastic nipple 81 which is affixed upon a tube sealing plug 82 seated in the air inlet end of each of the dielectric tubes 40. All of these connections are sealed with plastic cement or otherwise, so that the entire conduit from the air filter into the compartment of the dielectric tube 40 is hermetically sealed against the admission of air or leakage of ozone, and all of these parts, as above mentioned, are non-conductors and impervious to the destructive effects of electrical discharges and the presence of ozone.

The ozone receiving header $70^a$ is of the same construction as the header 70 above described and is provided with individual flexible plastic tube connections $75^a$ for each tube of the battery of ozone generating tubes; the connections $75^a$ being secured to the snout or neck ends 43 of the dielectric tubes, as shown in Figure 10. These connections are hermetically sealed. The header $70^a$ has a compartment therein into which all of the ozone is transmitted from the battery of tubes and it has one end wall thereof sealed and the opposite end provided with a flexible plastic tube 90 extending through a suitable opening 91 in the dividing wall 25 of the cabinet structure into the compartment 28 housing the compressor and other units of the device, as will be subsequently described.

While in Figures 1 and 2 the ozone generating tubes C have been shown in connected parallel, they may be arranged in series as shown in Figure 15. Here the tubes are supported upon the frame pieces 35 and 36 in the same relation above described. So far as applicable, the same reference characters have been given to Figure 15 as above described for the connection of the tubes in parallel. The air filter E has the air conducting tube 63 connected to the topmost ozone generating tube C′ and the latter at the ozone discharge end thereof is connected by a sealed plastic tube 53 with the next adjacent ozone generating tube C′, where the ozone from the first tube C′ is again treated; the discharge of the ozone from the second tube C′ being thru a similar plastic sealed connection 54 which opens into the next adjacent tube C′, as shown in Figure 15. This arrangement is continued to the last tube C′ where the ozone is led off thru the line 90 to the compressor F, as above described.

The advantage of this type of construction is that there is but one joint made for each end of each tube and there are a reduced number of points at which ozone-air leakage can occur. Also, there is a superior output of ozone with this construction, for any given rate of flow to the unit. This is engendered by the fact that the molecules of oxygen passing thru the zones of high tension discharge have been successively subject to such discharge in the preceding tubes and therefore already possess a high content of energy when they are ejected to similar discharges in successive tubes. Thus, even tho the time of passage thru a tube compartment wherein it is subjected to high tension discharges, is the same for a given molecule of oxygen, whether the tubes are connected in series or parallel, the higher energy state of each molcule as it passes thru successive tubes, in the modified construction, results in a higher number of these molecules breaking down into ozone. As much as 22% higher ozone output from a given body of air has been observed experimentally when connecting the nine tubes in series, as compared to connection of them in parallel, as shown in Figures 1 and 2.

Each ozone generating tube C is provided with an improved means for insuring the positive seating section of its inner electrode. This consists of a tapered phosphor bronze contact spring, shown in Figure 9 of the drawings at 100, having its end of greater diameter seated against the plastic plug 82. This end has a terminal extending thru the plug 82 for connection with a high tension wire 101. The spring 100 is tapered so it can be compactly compressed, and its smaller end seats against the end of inner electrode 45 for the purpose of urging it into seating position.

As shown in Figure 17 of the drawings, the ozone tube structure P includes a dielectric tube $40^a$ of the same nature as the tube 40 above described, but the tube $40^a$ is of uniform diameter from end to end. It is provided with plastic sealing plugs $82^a$ and $82^b$ at opposite ends thereof. The high tension inner electrode $45^a$ may be solid or tubular as desired, and constructed of suitable material, such as aluminum. At one end it may be reduced as shown at $46^a$ and seated against the inner end of the plug $82^b$. The electrode $45^a$ is provided with the above soft synthetic resin plastic nipples $50^a$, for the proper lateral seating of the electrode in definite spaced relation with respect to the dielectric tube. The tube $40^a$ is externally provided with a latter electrode tube or film material $51^a$ for the same purpose as the tube 51 of the tube C above described. The plastic plug $82^a$ is provided with a passageway for the sealed reception of a high tension wire $101^a$ which is suitably sealed in a plastic covering $102^a$. The wires $101^a$ may be relatively stiff and they may be spread as shown at $101^b$ in Figure 7 of the drawings for engaging against one end of the electrode $45^a$ to slightly yieldably hold the opposite reduced end $46^a$ against the inner surface of the plug $82^b$. The amount of force required is just necessary to prevent shifting of the electrode $45^a$ in the tube.

In Figure 17 the air conducting plastic tube 63 is shown as having a sealed connection in the plug $82^a$, and the flexible plastic exit tubes 53—54, etc. may be connected to the end plugs of the ozone generating tube, in the manner shown in Figure 17. While in this view the tube 63 direct from the air filter to the top tube has been designated, it is, of course, understood that the plastic tube connections 53—54 are secured to the end plugs in the same manner.

In the lower compartment 28 of the casing B is provided a centrifugal pump type compressor F driven by a motor G. These parts are mounted upon the bottom frame structure of the casing B. The ozone from the header $70^a$ enters the compressor pump through the tube 90. Immediately adjacent to the compressor F, at the inlet end thereof and in the path of ozone passing through the conduit 91, is disposed a suitable container 105 adapted to receive liquid tri alkyl silicone fluoride. This material acts as a lubricant and a coating for the interior of the compressor, in order to protect the compressor against the deteriorating effects of high temperatures, pressures and corrosion, and to act as a synthetic lubricant for the pump parts and as an efficient compression seal. Tests have been conducted in connection with a variety of lubricants for thus purpose. The peculiar conditions encountered in the injector type ozonizing of a liquid, as herein described, are high temperatures, moderately high pressures, a gas for compression which has a very high ozone content and the general necessity for using a pump or compressor made of metallic parts. It has been found that these conditions require a lubricant of extraordinary qualities in order that satisfactory and proper lubrication of the compressor may be obtained. Organic oils, including hydrocarbons, are totally unfit for this purpose because of their ready affinity for ozone. They oxidize with ease under the conditions stated and result in oxidized products which are gummy in character and which eventually induce the compressor to destroy itself. There are several series of synthetic products the molecules of which are so constituted and bonded that they are impervious to the oxidizing capacity of ozone, and yet have a high degree of that quality known to the lubrication art as "lubricity." This is understood to mean the ability to properly lubricate under existing conditions. Of these synthetic lubricants tri alkyl silicone fluoride has been found to meet the conditions. Not only do tri alkyl silicone fluoride compounds lubricate satisfactorily under the conditions stated, but they also form excellent protective coatings over the metal parts of the compressor and similar parts in a line beyond the compressor serving to protect the ozone from coming into contact with the metal, to which its stability is very much averse. One form of container 105 may receive the lubricant for transfer into the path of ozone entering the compressor by means of capillary attraction along a wick 106.

The compressor F is provided with a discharge line 110 into which the ozone is passed by the compressor under superatmospheric pressure of from 30 lbs. to 60 lbs. per square inch. This line may have a pressure gauge 111 therein. The ozone passes through a check valve 112 into an injector H, shown in detail in Figure 8 of the drawings.

Referring now to the supply of water intended to receive the ozone, the same enters a line 115 and is directed past a normally opened valve 116 into the top of the filter tank casing 117. After filtration it passes through the outlet line 118 into conduit 119. The conduit 119 may also connect via a union 120 (see Figure 1) with the line 115 and in the line 115 between the outlet 118 and the inlet line 115 is disposed a normally closed valve 121. This valve can be opened to bypass the filter tank.

In the line 119 may be placed an electrically operated solenoid stop valve 126 and a pressure regulating valve 127, which in the present case will ordinarily be a pressure reducing valve. The electrically operated solenoid stop valve 126 prevents fluid flow until the ozonation process has started and the pressure regulating valve 127 in the present case will permit the reduction of pressure of the water to approximately 20 lbs. at the entrance to the injector H. This, of course, can be determined by means of the gauge 130$^a$.

Referring now to the injector H, the same has been provided for the purpose of properly admixing ozone with the water whereby the ozone will remain finely dispersed throughout the water and enter the storage or supply tank in that condition, to permit the ozone to most effectively bring about the desired treatment upon the liquid being treated.

The injector H includes a T-shaped casing 130 having a water receiving compartment 131 therein. It has a lateral nipple 132 for connection with the water receiving line 119. An injector nozzle 135 is screw threaded at 136 into one end 137 of the casing 130. It is provided with a passageway 140 therethrough. The injector snout or nozzle 135 has a long body 141 extending the entire way through the chamber 131. It is provided with a streamlined convexly reduced discharge tip 143 having a calibrated orifice 144 therein which opens with a chisel-shaped edge at the discharge location 145. It is to be noted that the water or liquid will enter the compartment 131 well to the rear of the discharge orifice 144 so that the natural turbulence caused by entering of the water into the casing 130 will not influence fine dispersion of the ozone uniformly through the liquid being treated. The ozone has its pressure released at the discharge orifice; the same being so designed and of such size that a carefully predetermined pressure differential at opposite sides of the orifice will result in the discharge of the ozone into the liquid at a speed in excess of the speed travel of sound, approximately about 1100 feet per second. Of course the discharge of the ozone jet into the body of water will reduce the temperature at this location. It has been found that under these conditions the bubbles of ozone dispersed throughout the body of liquid is in the order of from 2 to 20 microns. After leaving the injector H, water passes thru a check valve 125 which prevents reverse flow of water under pressure existing in the tank which might otherwise back the water and ozone into the injector under non-operating conditions.

Referring to the modified form of injector N, shown in Figure 16, the same may include a T-shaped casing 130$^a$ having a compartment 131$^a$ therein. This T-shaped casing is provided with a laterally extending nipple 137$^a$ for receiving the injector nozzle structure 135$^a$. Water enters the casing 130$^a$ from the line 119 which is detachably connected in a screw threaded opening in the end 132$^a$ of the casing 130$^a$. The water enters into the compartment 131$^a$ and passes therethru in preferably a straight line and exits into the discharge line 150$^a$.

The nozzle construction 135$^a$ preferably consists of an elongated nozzle tube 200 mounted upon the inner end of a sleeve 201. The latter is detachably threaded in the internally screw threaded stem or nipple 137$^a$ of the casing structure 130$^a$. A stainless steel sleeve 201$^a$ is mounted in the outer end of the sleeve 201 secured thereto by means of silver solder 203. The ozone line 110$^a$ may enter directly or by means of a screw threaded nipple construction into the stainless steel sleeve 201$^a$. The nozzle body 200 is mounted in the lower end of the passageway of the sleeve 201 and seated therein by means of silver solder 204. The nozzle body 200 extends across the compartment 131$^a$ and has an orifice 205 facing in the direction of the discharge conduit 150$^a$ at the opposite side of the nozzle from the water inlet conduit 119. The inner end of the nozzle 200 may be rounded, as shown at 200$^a$ to prevent turbulence and, of course, the body 200 is cylindrical. The water enters in a horizontal line and runs straight thru the chamber 131$^a$ to the discharge line 150$^a$. The ozone nozzle structure is vertically disposed. With this construction fluid trapped in the line between the electrically operated stop valve shown at 126 in the drawing, and the water check valve will expand to final position without flowing back thru the orifice 205 and into the injector top and thence back into the compressor. The amount of lift thru vertical disposition of the injector will preclude flow to an injurious degree. It is to be understood that all of the advantages stated for the injector H above described appertain also to the modified form of injector N.

It should be noted that the entire apparatus is started and stopped by means of a pressure regulated system associated with the storage tank M. The intermingled water and ozone enter the top of the tank M through a conduit 150 mounted upon the top wall 151. The ozone and water is deflected through a spray R into the ozone area at the top of the tank above the normal level of water. At the start of the cycle the ozonated water falls to the bottom of the tank compartment. Air is forced into the pipe 153 wherein a float valve structure 154 is located and thence the air is vented to the atmosphere through an opening in a boss 155. As the ozonated water rises in the tank M, it eventually reaches the level of float valve 154, since the line 153 is connected at 160 with the bottom water discharge line 161 leading from the tank. The float 154 operates a valve (not shown) which will close off the air vent as the level of water reaches the float. Pressure then begins to build up in the tank and when it reaches a predetermined setting on pressure switch 165, shown in Figure 1, this switch will open and break all circuits through the apparatus. The line 166 for the discharge of the ozonated water or liquid may have any suitable valve means (not shown) to permit control and proper supply of the ozonated water to the desired location.

Current is admitted through a standard plug-in indicated at 180 in Figure 1 of the drawings, and thence passes through wires 181 and 182. The wire 181 may have a manually operated control switch 183 therein and this wire extends to the pressure switch 165 above described. The wire 182 also leads to the pressure switch but it has intermediate broken connections with suitable bus bars 185 and 186 which control flow of the current to the various units of the apparatus. From these bus bars current conducting lines are extended to the high tension transformer J; fan K; motor G, and solenoid actuated valve 126.

The primary winding of the transformer J is connected in the normal voltage line from the bus bars, and the secondary of the transformer carrying the high tension voltage has one end grounded at 190 to the metal tube generating frame wall 36, as shown in Figure 1, and the opposite end connected at 191 to a suitable conductor bar 192 having detachable jacks 194 for disposition in the sockets thereof, one of which is provided for each of the wires 101 above described in connection with the ozone generating tubes C.

The operation of the apparatus and the method of producing ozone and insuring a proper dispersion of it throughout the body of liquid to be treated will be apparent from the foregoing. The filtered air is drawn through the battery of tubes C at a pressure slightly sub-atmospheric and subjected to the high tension alternating current voltage. The generated ozone is then collected in the header $70^a$ and directed in a stream pass synthetic silicone containing lubricant supply device for gathering sufficient of the lubricant to coat the interior walls of the compressor and its rotor in order to insure protection of the compressor and an effectual compressor seal. If desired, this composition may be otherwise directed to the compressor such as by a permanent coating upon the internal walls and all of the structure of the compressor through which the ozone passes. At a pressure of from 30 to 60 lbs. the ozone is then directed to the injector and enters the body of water, after the entering turbulence of the water has been dissipated, at acoustic speed. The water has a lower pressure than the ozone before it enters the injector and the finely dispersed droplets of ozone will remain in such condition in the water or liquid after entering the tank M. In the tank M a pressure of from 20 lbs. to 40 lbs. per sq. in. is maintained. This has been found sufficient to prevent release of the dissolved ozone from the water while within the tank to the partition coefficient capacity at equilibrium between air-ozone and water-ozone solutions.

The internal pressure of bubbles in a body of liquid varies inversely with respect to their diameter. For that reason it has been found highly desirable to obtain the smallest possible bubble size.

A carefully studied series of laboratory tests on the stability of ozone under varying conditions, has shown that all metals include a deteriorating influence upon ozone. This influence varies widely, but it is generally true that the rate of reconversion of ozone to oxygen is accelerated proportionately to the area of metal with which the ozone comes in contact. It will be noted from the foregoing that there has been a careful elimination of all metal parts with which ozone could come into contact in intimate relation, and where metal is mandatory, such as in connection with the compressor-pump, a constant flushing of the surfaces of the metal by the impervious synthetic lubricant has been provided for.

It is within the contemplation of this invention to eliminate all metal parts between the ozone generating unit and the receiving tank wherein the ozonated liquid is received. That is, the ozone in its travel to the injector and thru the injector and to the receiving tank, will be free of metallic contact. To that end, the parts including valves, injector, etc. may be made of suitable non-metallic material, such as synthetic plastic. In particular, the ozone as it is received from the ozone generating unit, may be received in a blower type compressor of rigid synthetic resin or other non-metallic material, not subject to deteriorating effects of ozone and which in itself will not decrease the value of the ozone generated for discharging the ozone at acoustic speeds into the water, as above designated. Under such circumstances, the use of synthetic silicone lubricant can be omitted.

In order to obtain acoustic velocities of the jet of ozone, the orifice dimensions when the ozone is directed into a down stream should follow the formula $$\frac{A_1}{A_2}>25 \text{ and } \frac{P_2}{P_1}<0.53$$

In this formula $A_2$ equals the cross sectional area of the orifice opening at the throat thereof; $A_1$ equals the area of the cross sectional area of the tube passage immediately leading to the orifice; $P_1$ equals the approximate pressure existing in the passageway of the tube from which the orifice resumes gas; and $P_2$ equals the pressure existing in the throat of the orifice.

It has furthermore been found that ozone will decompose into oxygen according to the formula ($2O_3>3O_2$+heat). Because induced pressure is favorable to this reaction, it is desirable to maintain a low temperature in the ozone and water mix so as to permit only a minimum time at reduced pressure on the discharge side of the jet orifice. For that reason the orifice housing is externally streamlined so that the water will flow smoothly over the outer surface thereof and the pressure of the water behind the orifice housing should be great enough to maintain new water flowing constantly into contact with the ozone jet.

The partition coefficient, that is, the ratio of ozone in water to ozone in air when the two are in a closed vessel is stated in literature well known to those skilled in the art, to vary from .27 to .35. It averages about .30. However, the the ozone remaining in water which is vented to atmosphere is essentially zero. Therefore, in order to maintain a residual of ozone in water in order that sufficient time may elapse during which oxidation will occur, a closed or pressure vessel is used. Oxidation normally is completed immediately at the time of contact. It has been stated that .2 part per million of residual ozone in water is sufficient to insure that the concentration necessary for purification treatment of water has been obtained.

If air is flowing at 9 liters per minute and the concentration of ozone in the air is 7.65 milligrams per liter, then 68.85 milligrams per minute of ozone are passed. If one U. S. gallon equals 3.785 liters and 4 gallons per minute of water flow, then 15.14 liters of water per minute flow. Assuming equilibrium to be established and treating X=milligrams of ozone in air
Y=milligrams of ozone in water:

then $$x+y=68.85$$

$$\left(\frac{x}{9}\right).3=\frac{y}{15.14}$$

$$4.542x=9y$$

$$4.542(68.85-y)=9y$$

$$13.542y=311$$

$$y=23$$

$$\frac{y}{15.14}=1.55 \text{ parts per million}$$

This is seven times the amount of ozone necessary for satisfactory reduction and control of contamination in water.

Various changes in the steps of the methods and to the shape, size and arrangement of parts of the apparatus herein described, may be made without departing from the spirit of the invention or the scope of the claims.

I claim:

1. The method of purification of liquids which consists in generating ozone, compressing the ozone to substantially above super atmospheric pressure, and while under such pressure discharging the ozone in a substantially wholly gaseous stream at atomizing high velocity speed into a body of liquid under super atmospheric pressure less than that super atmospheric pressure of the ozone which exists prior to discharge of the ozone in an atomizing stream into the liquid.

2. The method as claimed in claim 1 wherein the super atmospheric pressure of the ozone prior to high velocity discharge into the water is at least twice the amount of super atmospheric pressure of the liquid into which the high velocity stream of ozone is discharged.

3. The method of purification of fluids which consists in generating ozone under normal atmospheric pressure, subsequently compressing the ozone to a degree substantially above super atmospheric pressure, discharging the super atmospheric pressurized ozone in a high velocity substantially wholly gaseous jet stream into a body of fluid to be purified for a finely dispersed intermixing of the ozone and fluid to be purified, and storing the intermixed ozone and fluid under super atmospheric pressure.

4. A method of purification as described in claim 3 wherein the super atmospheric pressure of the ozone prior to translation into a high velocity jet stream is substantially greater than twice the pressure of the fluid into which the ozone jet stream is discharged.

5. Apparatus for the purification of liquids, comprising an ozone generator, a compressor for compressing the ozone as received from the generator, means for preventing oxidation and destruction of the parts of the compressor as a result of coming into travel contact with the ozone, an injector, means for passing a body of liquid to be purified into the injector under super atmospheric pressure, and means for discharging the super atmospheric pressurized ozone from the compressor in a high velocity liquid atomizing wholly gaseous jet stream into the liquid to be purified within the injector.

6. Apparatus as described in claim 5 wherein a storage receptacle is provided for storing the intermixed ozone and liquid to be purified under super atmospheric pressure.

7. The method of treating liquids for purification purposes, which consists in injecting a wholly gaseous body of ozone while under super atmospheric pressure in finely divided and dispersed atomized condition into a flowing body of water to be purified while the said body of water is under super atmospheric pressure appreciably less than the super atmospheric pressure of the ozone prior to its jet discharge into the water.

8. The method of treating liquids for purification thereof, which consists in injecting a body of ozone while under super atmospheric pressure at a speed substantially equivalent to the speed travel of sound in an atomizing jet stream into the body of liquid to be purified.

9. A method of treating liquids for purification purposes which consists in generating an ozone-air gas mixture, compressing said gas to super atmospheric pressure in the presence of a synthetic silicone fluoride lubricant, and discharging a wholly gaseous body of air-ozone at a high jet velocity in a finely divided and dispersed atomized condition into the body of liquid to be purified while the said body of liquid is under a super atmospheric pressure appreciably less than that of the air-ozone gas mixture just prior to its jet discharge into said liquid.

NATHANIEL S. PRIME.

References Cited in the file of this patent

UNITED STATES PATENTS

| Number | Name | Date |
|---|---|---|
| 430,387 | Kennedy | June 17, 1890 |
| 837,107 | Otto | Nov. 27, 1906 |
| 969,736 | Twombly | Sept. 6, 1910 |
| 1,006,992 | Wiener | Oct. 24, 1911 |
| 1,103,211 | Knips | July 14, 1914 |
| 1,138,202 | Erlwein et al. | May 4, 1915 |
| 1,169,825 | Hoofnagle | Feb. 1, 1916 |
| 1,172,468 | Leggett | Feb. 22, 1916 |
| 1,362,999 | Lindemann | Dec. 21, 1920 |
| 1,363,589 | Hartman | Dec. 28, 1920 |
| 1,417,046 | Ellis | May 23, 1922 |
| 1,420,046 | Mac Gregor et al. | June 20, 1922 |
| 1,544,838 | Hartman | July 7, 1925 |
| 2,009,230 | Hartman | July 23, 1935 |
| 2,043,701 | Hartman | June 9, 1936 |
| 2,048,158 | Goodwin | July 21, 1936 |
| 2,050,771 | Wait | Aug. 11, 1936 |
| 2,055,808 | Wait | Sept. 29, 1936 |
| 2,195,981 | Conant | Apr. 2, 1940 |
| 2,404,778 | Allison | July 30, 1946 |
| 2,405,553 | Allison | Aug. 13, 1946 |
| 2,426,121 | Rust et al. | Aug. 19, 1947 |
| 2,456,496 | Ford et al. | Dec. 14, 1948 |
| 2,606,150 | Thorp | Aug. 5, 1952 |

FOREIGN PATENTS

| Number | Country | Date |
|---|---|---|
| 166,211 | Great Britain | July 11, 1921 |